(12) United States Patent
Usuki

(10) Patent No.: US 12,339,379 B2
(45) Date of Patent: Jun. 24, 2025

(54) TARGET TRACKING DEVICE AND STORAGE MEDIUM STORING TARGET TRACKING PROGRAM

(71) Applicant: MITSUBISHI HEAVY INDUSTRIES, LTD., Tokyo (JP)

(72) Inventor: Tomoaki Usuki, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 69 days.

(21) Appl. No.: 17/675,188

(22) Filed: Feb. 18, 2022

(65) Prior Publication Data

US 2023/0082775 A1     Mar. 16, 2023

(30) Foreign Application Priority Data

Sep. 15, 2021   (JP) ................. 2021-150040

(51) Int. Cl.
  *G01S 19/40*      (2010.01)
  *G01S 19/11*      (2010.01)
  *G01S 19/33*      (2010.01)

(52) U.S. Cl.
  CPC ............ *G01S 19/40* (2013.01); *G01S 19/115* (2019.08); *G01S 19/33* (2013.01)

(58) Field of Classification Search
  None
  See application file for complete search history.

(56) References Cited

U.S. PATENT DOCUMENTS

| | | |
|---|---|---|
| 6,359,681 B1 | 3/2002 | Housand et al. |
| 2010/0038490 A1 | 2/2010 | Hofschuster et al. |

(Continued)

FOREIGN PATENT DOCUMENTS

| | | | |
|---|---|---|---|
| CN | 111796311 A | * | 10/2020 |
| CN | 112874814 A | | 6/2021 |

(Continued)

OTHER PUBLICATIONS

Du Hongwei, Target object state monitoring method and device and computer readable medium, 2020 Cited NPL) (Year: 2020).*

(Continued)

*Primary Examiner* — James M McPherson
*Assistant Examiner* — Bakari Underwood
(74) *Attorney, Agent, or Firm* — Wenderoth, Lind & Ponack, L.L.P.

(57) ABSTRACT

A target tracking device to estimate a position of a target with high accuracy will be provided. The target tracking device is provided with a communication device and a processor. The communication device performs communication with a plurality of observation satellites that observe the target. The processor executes a selection of satellites, a setting of a schedule and an estimation. The selection of satellites includes selecting two or more selected satellites that observes the target among the plurality of observation satellites. The setting of the schedule includes determining an observation schedule for each of the two or more selected satellite to observe the target and transmitting an observation request signal that represents the determined observation schedule to a corresponding selected satellite. The estimation includes estimating the position of the target based on two or more pieces of high-precision observation information respectively observed by the two or more selected satellites.

7 Claims, 8 Drawing Sheets

(56) References Cited

U.S. PATENT DOCUMENTS

2013/0275036 A1* 10/2013 Olivier .................. B64G 1/242
                                                              701/301
2018/0252818 A1*  9/2018 Sato ........................ G01S 19/28
2018/0284293 A1* 10/2018 Pan ......................... G01S 19/45

FOREIGN PATENT DOCUMENTS

| JP | 9-318726 | 12/1997 |
| JP | 2007-93609 | 4/2007 |
| JP | 2008126876 A * | 6/2008 |
| WO | 2017/046914 A1 | 3/2017 |

OTHER PUBLICATIONS

Tomoe Funayama, Observation satellite group control system, observation satellite, ground station, and observation satellite group control method, Jun. 5, 2008 (Year: 2008).*

Japanese Office Action issued Apr. 1, 2025 in corresponding Japanese Patent Application No. 2021-150040, with English translation, 9 pages.

* cited by examiner

FIG. 4

510:Observation Schedule

| Observation Time | Observation Position | Target Number |
|---|---|---|
| XX:XX:XX.XXXX | NXXXXXXXX WXXXXXXXXX | 26 |
| XX:XX:XX.XXXX | NXXXXXXXX WXXXXXXXXX | 29 |
| XX:XX:XX.XXXX | NXXXXXXXX WXXXXXXXXX | 41 |
| ⋮ | ⋮ | ⋮ |

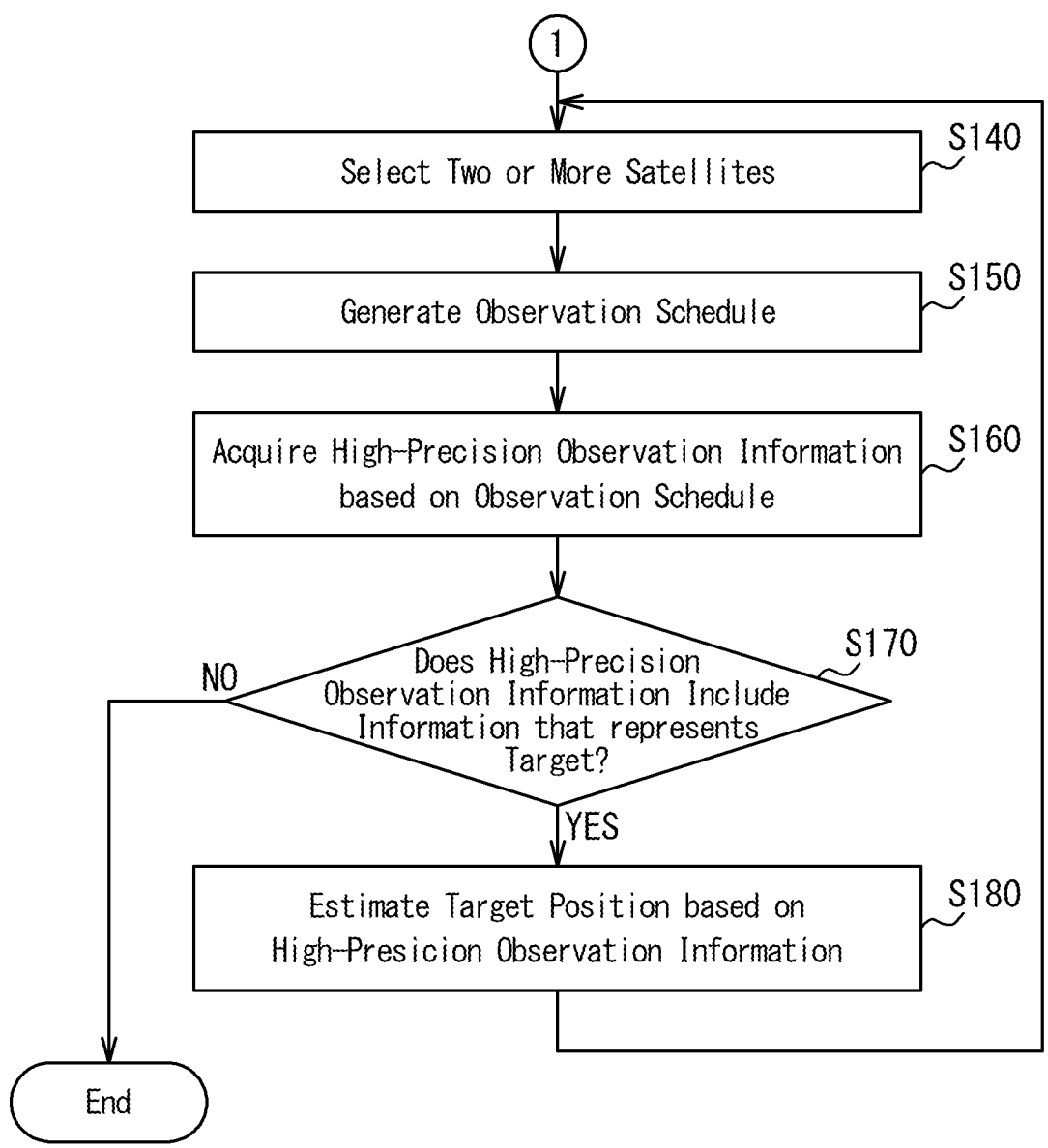

TARGET TRACKING DEVICE AND STORAGE MEDIUM STORING TARGET TRACKING PROGRAM

CROSS REFERENCE

This application claims priority of Japanese Patent Application No. 2021-150040, filed on Sep. 15, 2021, the disclosure of which is incorporated herein by reference.

TECHNICAL FIELD

The present invention relates to a target tracking device and storage medium storing a target tracking program.

BACKGROUND

Methods for tracking a target such as a flying body is being researched. Patent Literature 1 discloses a method for each of two aircrafts to measure angular information from the aircrafts to the target by use of a passive sensor and estimate a position of the target in order to track the target. On the other hand, Patent Literature 2 discloses a method for recognizing a target with high accuracy by use of infrared rays and a laser.

CITED REFERENCES

Patent Literature

[Patent Literature 1] Japanese Patent Publication No. H09-318726
[Patent Literature 2] Japanese Patent Publication No. 2007-93609

SUMMARY

Generally, when tracking a target by use of an artificial satellite, a position of the target is specified based on observation information observed by a single artificial satellite. As a result, a position of the target including an altitude for example cannot be observed with high accuracy.

According to the above situation, an objective is to provide a target tracking device that observes a position of a target with high accuracy. Other objectives will be understood from following disclosures and descriptions of embodiments.

A target tracking device according to an embodiment to achieve the above objective is provided with a communication device and a processor. The communication device performs communication with a plurality of observation satellites that observes a target. The processor estimates a position of the target based on high-precision observation information that represents information of the target observed by the plurality of observation satellites. The processor executes a selection of satellites, a setting of a schedule and an estimation. The selection of satellites includes selecting, based on a position of the target, two or more selected satellites that observes the target among the plurality of observation satellites. The setting of the schedule includes determining an observation schedule for each of the two or more selected satellites to observe the target and transmitting observation request signal that represents the determined observation schedule to a corresponding selected satellite of the two or more selected satellites. The estimation includes estimating, based on two or more pieces of high-precision observation information respectively observed by the two or more selected satellites, the position of the target, and outputting an output signal that represents the estimated position of the target. In the observation schedule, a first time when a first selected satellite of the two or more selected satellites observes the target is same as a second time when a second selected satellite of the two or more selected satellites observes the target.

A storage medium that stores a target tracking program according to an embodiment to achieve the above objective makes a processor execute a selection of satellites, a setting of a schedule and an estimation. The selection of satellites includes selecting, based on a position of a target, two or more selected satellites that observe the target, among a plurality of observation satellites. The setting of the schedule includes determining an observation schedule for each of the two or more selected satellites to observe the target, and transmitting an observation request signal that represents the determined observation schedule to a corresponding selected satellite of the two or more selected satellites. The estimation includes estimating, based on two or more pieces of high-precision observation information respectively observed by the two or more selected satellites, the position of the target, and outputting an output signal that represent the estimated position of the target. In the observation schedule, a first time when a first selected satellite of the two or more selected satellites observes the target is same as a second time when a second selected satellite of the two or more selected satellites observes the target.

According to the above embodiment, a position of a target can be observed with high accuracy.

BRIEF DESCRIPTION OF THE DRAWINGS

FIG. 4 is a diagram that shows a configuration of an observation schedule according to an embodiment.
FIG. 7B is a flowchart that shows a process of the target tracking system according to an embodiment.

Figure 1:
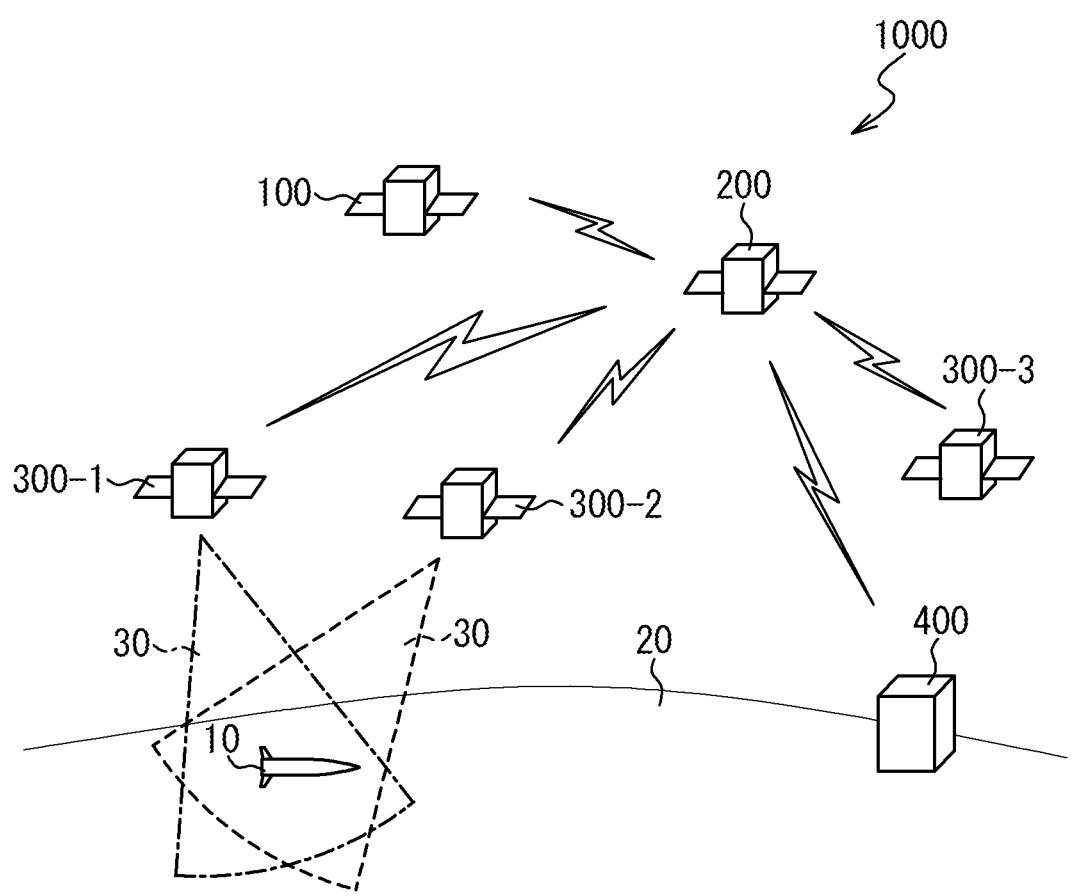
FIG. 1 is a schematic configuration diagram of a target tracking system according to an embodiment.

DETAILED DESCRIPTION (Embodiment) As shown in FIG. 1, a target tracking system 1000 according to an embodiment is provided with an early warning satellite 100, a communication satellite 200, a plurality of observation satellites 300 such as a first observation satellite 300-1, a second observation satellite 300-2 and a third observation satellite 300-3, and a target tracking device 400. The communication satellite 200 forms a communication network and connects the early warning satellite 100, the plurality of observation satellites 300 and the target tracking device 400 so that they can communicate with each other. The communication satellite 200 forms the communication network by use of optical communication for example. Herein, when the first observation satellite 300-1, the second observation satellite 300-2 and the third observation satellite 300-3 are not distinguished, they will be referred to as observation satellites 300.

The target tracking system 1000 estimates a position of a target 10 with high accuracy. For example, the early warning satellite 100 observes a relatively wide area to acquire wide area observation information including information that represents a target 10 existing in an observation range, such as a missile or an aircraft. The wide area observation information observed by the early warning satellite 100 is transmitted to the target tracking device 400 through the communication satellite 200. The target tracking device 400 estimates, based on the wide area observation information transmitted from the early warning satellite 100, a position of the target 10. The target tracking device 400 instructs two or more observation satellites 300 so that the two or more observation satellites 300 observe the target 10 at same time, in order to estimate the position of the target 10 with high accuracy. The observation satellites 300 adjust themselves so that the target 10 enters in an observation range 30, that is a relatively narrow range, to observe the target 10, based on the instruction from the target tracking device 400. High-precision observation information (observation information) observed by the observation satellites 300 is transmitted to the target tracking device 400. The target tracking device 400 estimates the position of the target 10 by use of principle of triangulation, based on two or more pieces of high-precision observation information acquired by the two or more observation satellites 300.

As described above, the target tracking system 1000 estimates the position of the target 10 with high accuracy by setting an observation schedule by which the observation satellites 300 observe the target 10.

Figure 2:
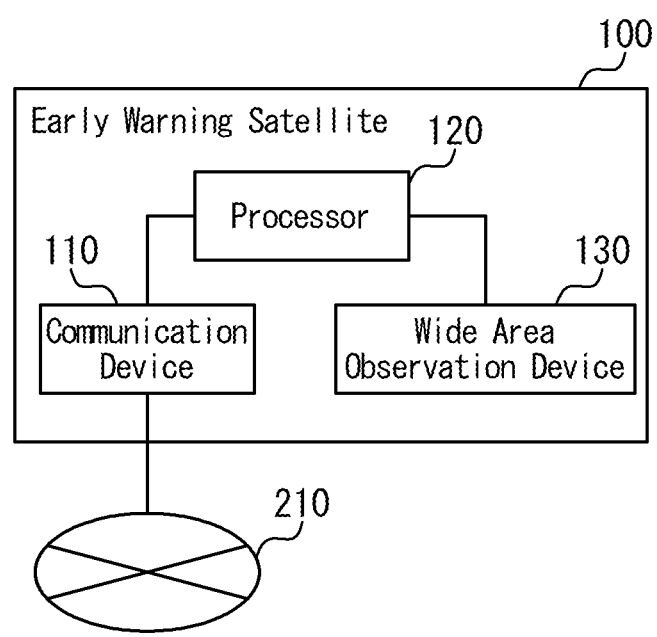
FIG. 2 is a schematic configuration diagram of an early warning satellite according to an embodiment.

(Configuration of target tracking system) A configuration of the target tracking system 1000 will be described. The early warning satellite 100 is arranged in a high orbit, a geosynchronous orbit for example, and is configured to observe a direction in which the earth exists from the high orbit to acquire wide area observation information of a wide area including the target 10. The target 10 represents a flying body that moves in an orbit lower than the early warning satellite 100, such as a missile, an aircraft or the like. As shown in FIG. 2, the early warning satellite 100 is provided with a communication device 110, a processor 120 and a wide area observation device 130.

The communication device 110 is configured to connect to a satellite communication network 210 formed by the communication satellite 200 by use of wireless communication and to perform communication with the target tracking device 400. The communication device 110 transfers a signal acquired from the target tracking device 400 to the processor 120. In addition, the communication device 110 transfers a signal generated by the processor 120 to the target tracking device 400. The communication device 110 includes for example various interfaces such as a transceiver that transmits and receives optical signals.

The wide area observation device 130 is configured to observe the direction in which the earth exists and to acquire the wide area observation information, based on an instruction from the processor 120. The wide area observation device 130 observes, for example, a relatively wide area of a ground surface 20 in a direction fixed by the early warning satellite 100. The wide area observation device 130 acquires, by observing the ground surface 20 from the high orbit, the wide area observation information including information that represents the position of the target 10 moving in the atmosphere or a low orbit. The wide area observation device 130 is a passive sensor for example and includes an imaging device such as an infrared camera or a visible light camera. For example, the wide area observation information is a wide area captured image that is captured from the high orbit in a direction in which the earth exists and the information that represents the position of the target 10 represents an area in which the target 10 is captured in the wide area captured image.

The processor 120 is configured to control the wide area observation device 130 and to generate a wide area observation signal that represents wide area observation information acquired from the wide area observation device 130. The generated wide area observation signal is transmitted by the processor 120 to the target tracking device 400. The processor 120 controls the wide area observation device 130 to regularly acquire wide area observation information. In addition, the processor 120 may control the wide area observation device 130 to acquire wide area observation information based on an instruction from outside the early warning satellite 100, from the target tracking device 400 for example. For example, the processor 120 includes a Central Processing Unit (CPU) or the like.

Figure 3:
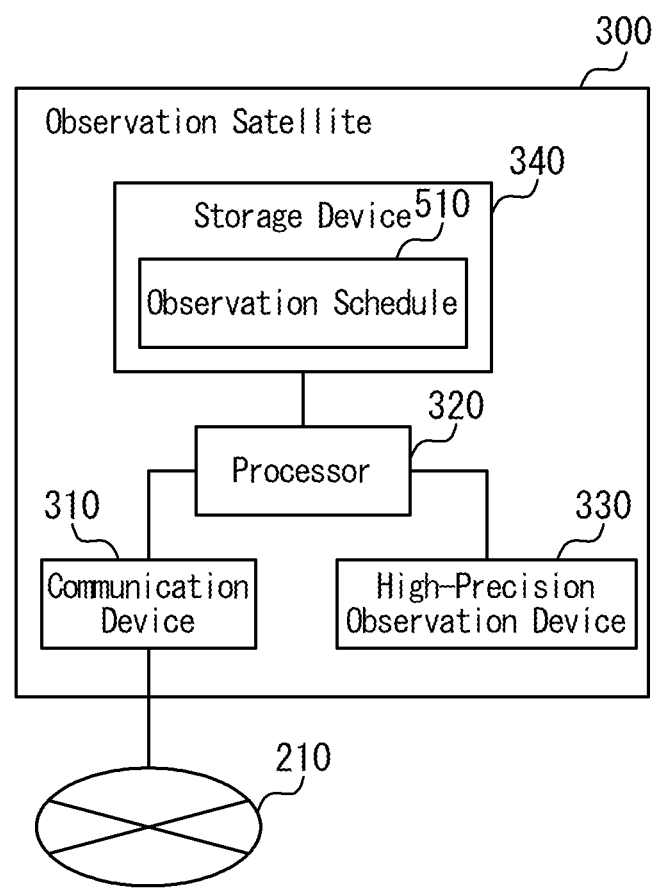
FIG. 3 is a schematic configuration diagram of an observation satellite according to an embodiment.

An observation satellites 300 is arranged in a low orbit, at an altitude lower than 1,000 km for example, and is configured to observe from the low orbit a direction in which the earth exists and to acquire high-precision observation information including information of the target 10. The target 10 represents a flying body that moves in an orbit lower than the observation satellites 300. The observation satellite 300 observes a relatively narrow area of the ground surface 20 in comparison with the early warning satellite 100. As shown in FIG. 3, the observation satellite 300 is provided with a communication device 310, a processor 320, a high-precision observation device 330 and a storage device 340.

The communication device 310 is configured to connect the satellite communication network 210 by use of wireless communication and to perform communication with the target tracking device 400. The communication device 310 transfers a signal acquired from the target tracking device 400 to the processor 320. In addition, the communication device 310 transfers a signal generated by the processor 320 to the target tracking device 400. The communication device 310 includes, for example, various interface such as a transceiver that transmits and receives an optical signal.

The high-precision observation device 330 is configured to observe a direction in which the earth exists and to acquire high-precision observation information, based on an instruction from the processor 320. The high-precision observation device 330 observes a relatively narrow area of the ground surface 20, for example. The high-precision observation device 330 acquires, by observing the ground surface 20 from the low orbit, high-precision observation information including information that represents a position of the target 10 moving in the atmosphere or a low orbit. The high-precision observation device 330 is a passive sensor for example and includes an imaging device such as an infrared camera or a visible light camera. For example, the high-precision observation information is a high-precision captured image captured from a low orbit in a direction in which the earth exists and the information that represents the position of the target 10 represents an area in which the target 10 is captured in the high-precision captured image.

The high-precision observation device 330 is provided with an actuator configured to adjust an observation direction in which the high-precision observation device 330 observes. The high-precision observation device 330 drives the actuator, observes a specified observation direction and acquires high-precision observation information, based on an instruction from the processor 320.

The storage device 340 is configured to store various data for the processor 320 to control the high-precision observation device 330, such as an observation schedule 510. The observation schedule 510 is established in correspondence with each observation satellite 300, and indicates a time and a position for the high-precision observation device 330 of the corresponding observation satellite 300 to observe.

As shown in FIG. 4 for example, the observation schedule 510 represents an observation time, an observation position and a target number. The observation time represents a time for the high-precision observation device 330 of the corresponding observation satellite 300 to observe. The observation position represents a position for the high-precision observation device 330 of the corresponding observation satellite 300 to observe, such as a latitude and a longitude. The target number represents an identifier of the target 10 that the high-precision observation device 330 of the corresponding observation satellite 300 observes. For example, when the high-precision observation device 330 is an imaging device such as an infrared camera, the observation schedule 510 shows that the high-precision observation device 330 captures an area including the position represented as the observation position at the time represented as the observation time and to capture the target 10 of the identifier represented as the target number. The observation position represents for example a center position of the area that the high-precision observation device 330 captures and represents the position of the target 10 represented by the target number. The observation schedule 510 may be set so that a single observation satellite 300 carries on observing a single target 10 or may be set so that a single observation satellite 300 switches between a plurality of targets 10 to observe. For example, the observation schedule 510 may be set so as to observe different targets 10 at different observation times.

The processor 320 shown in FIG. 3 is configured to control the high-precision observation device 330 and to generate a high-precision observation signal that represents high-precision observation information acquired from the high-precision observation device 330. The processor 320 controls the high-precision observation device 330 based on the observation schedule 510. For example, the processor 320 acquires a position and an attitude of the observation satellite 300 equipped with the processor 320. Based on the position and the attitude that are acquired, the processor 320 specifies an observation direction of the high-precision observation device 330 and controls the high-precision observation device 330 to observe the specified observation direction, in order to observe the observation position indicated in the observation schedule 510. The processor 320 generates the high-precision observation signal that represents the high-precision observation information acquired from the high-precision observation device 330. The generated high-precision observation signal is transmitted by the processor 320 to the target tracking device 400. For example, the processor 320 includes a CPU or the like.

Figure 5:
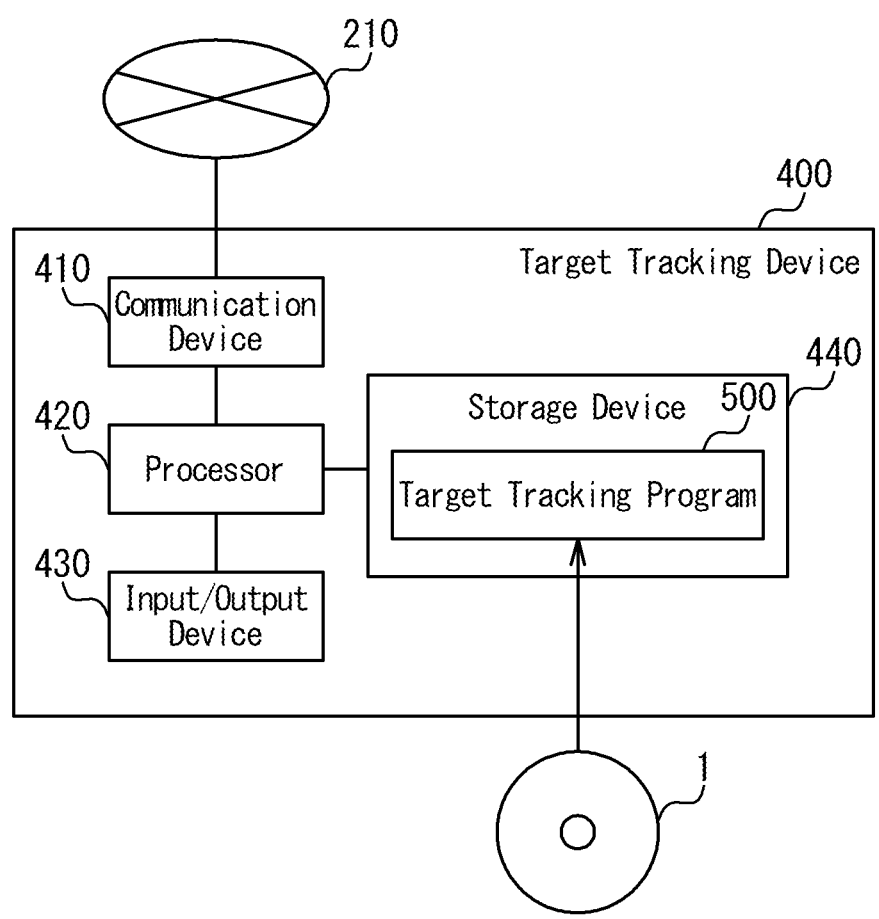
FIG. 5 is a schematic configuration diagram of a target tracking device according to an embodiment.

The target tracking device 400 shown in FIG. 1 is arranged in a facility installed on the ground surface 20 and is configured to perform communications with the early warning satellite 100 and the observation satellites 300 from the ground through the communication satellite 200 and to estimate the position of the target 10. As shown in FIG. 5, the target tracking device 400 is provided with a communication device 410, a processor 420, an input/output device 430 and a storage device 440.

The communication device 410 is configured to connect to the satellite communication network 210 by use of wireless communication and to perform communication with the early warning satellite 100 and the observation satellites 300. The communication device 410 transfers a signal acquired from the early warning satellite 100 or the observation satellites 300 to the processor 420. In addition, the communication device 410 transfers a signal generated by the processor 420 to the target tracking device 400. In addition, the communication device 410 may perform communication with other devices. The communication device 410 includes for example various interfaces such as a transceiver for performing wireless communication with the communication satellite 200, a Network Interface Card (NIC), a Universal Serial Bus (USB).

Information for the processor 420 to execute a process is inputted to the input/output device 430. In addition, the input/output device 430 is configured to output a result of a process executed by the processor 420. The input/output device 430 includes various input devices and output devices and includes for example a keyboard, a mouse, a microphone, a display, a speaker, a touch panel or the like. The input/output device 430 may be omitted.

The storage device 440 is configured to store various data for estimating the position of the target 10, a target tracking program 500 for example. The storage device 440 is used as a non-transitory tangible storage medium that stores the target tracking program 500. The target tracking program 500 may be provided as a computer program product recorded in a computer-readable recording medium 1, or may be provided as a computer program product that is downloadable from a server.

The processor 420 is configured to perform various data processes for estimating the position of the target 10. The processor 420 reads out the target tracking program 500 from the storage device 440, executes it and estimates the position of the target 10. For example, the processor 420 includes a CPU or the like.

Figure 6:
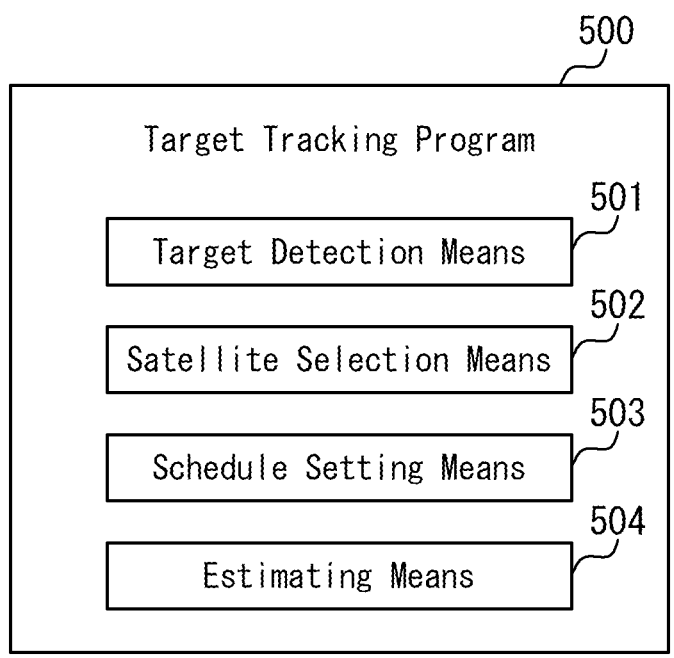
FIG. 6 is a diagram that shown a configuration of a target tracking program according to an embodiment.

As shown in FIG. 6, the target tracking program 500 is configured to make the processor 420 execute a target detection means 501, a satellite selection means 502, a schedule setting means 503 and an estimating means 504. The target detection means 501 acquires wide area observation information of the target 10 from the early warning satellite 100 and estimates the position of the target 10. The satellite selection means 502 selects, based on the position of the target 10, two or more observation satellites 300 that observe the target 10. The schedule setting means 503 sets the observation schedule 510 that indicates a time for the selected two or more observation satellites 300 to observe the target 10. The estimating means 504 estimates, based on the high-precision observation information observed by each of the two or more observation satellites 300, the position of the target 10 with high accuracy.

Figure 7A:
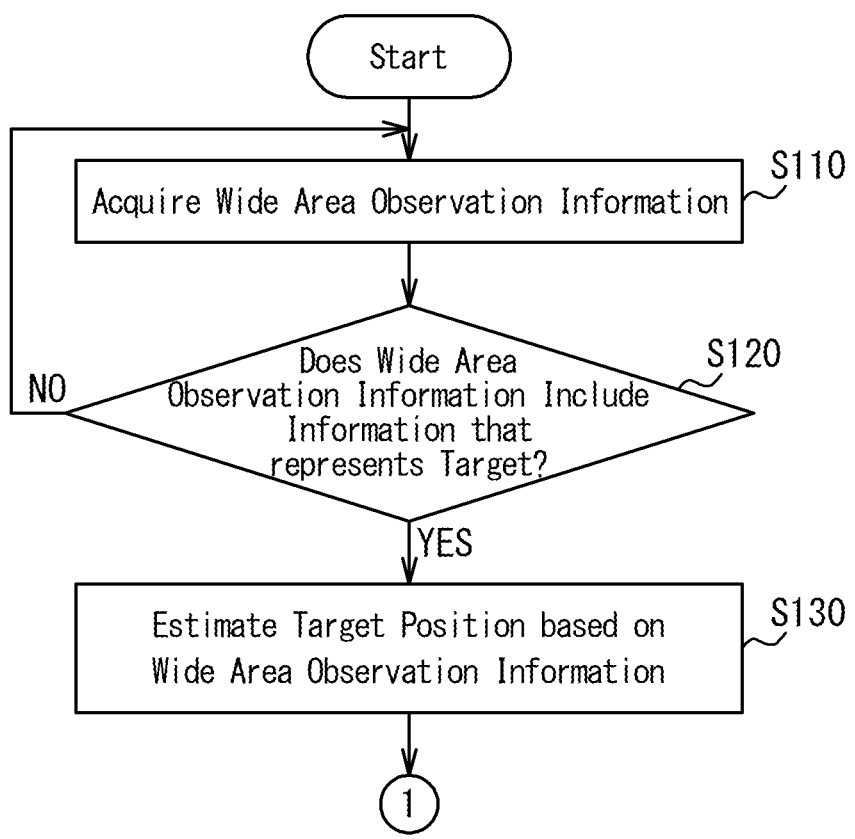
FIG. 7A is a flowchart that shows a process of the target tracking system according to an embodiment.

(Operation of target tracking system) The target tracking system 1000 executes a process shown in FIGS. 7A and 7B that is a target tracking method, estimates the position of the target 10 and tracks the target 10. The process shown in FIGS. 7A and 7B starts for example when the target tracking system 1000 starts. For example, when the target tracking device 400 shown in FIG. 5 starts, the processor 420 executes the target tracking program 500 and executes each means shown in FIG. 6.

In the step S110 shown in FIG. 7A, the processor 120 of the early warning satellite 100 uses the wide area observation device 130, observes a relatively wide area of the ground surface 20 from the high orbit and acquires wide area observation information. The processor 120 generates the wide area observation signal that represents the acquired wide area observation information and transmits the wide area observation signal to the processor 120 of the target tracking device 400 through the satellite communication network 210. For example, the wide area observation device 130 captures a relatively wide area of the ground surface 20 and acquires the wide area captured image. The processor 120 generates the wide area observation signal that represents the wide area observation image and transmits the wide area observation signal from the communication device 110 to the processor 410 of the target tracking device 400. The wide area observation information may include information that represents a position of the early warning satellite 100 and an attitude of the early warning satellite 100 when the wide area observation device 130 observed the target.

In the step S120, the processor 420 of the target tracking device 400 determines, based on the wide area observation signal, whether the wide area observation information includes information that represents the target 10. The processor 420 extracts, when the wide area observation signal is received, the wide area observation information such as the wide area captured image from the wide area observation signal. The processor 420 determines whether the extracted wide area observation information includes information that represents the target 10. For example: when the wide area captured image includes an area that represents the target 10, the processor 420 determines that the wide area observation information includes information that represents the target 10; and when the wide area captured image includes no area that represents the target 10, the processor 420 determines that the wide area observation information includes no information that represents the target 10. When the processor 420 determines that the wide area observation information includes no information that represents the target 10, the process returns to the step S110 and the processor 120 of the early warning satellite 100 acquires the wide area observation information. When the processor 420 determines that the wide area observation information includes information that represents the target 10, the step S130 is executed.

In the step S130, the processor 420 estimates, based on the wide area observation information, the position of the target 10. For example, the processor 420 extracts the position and the attitude of the early warning satellite 100 from the wide area observation information and determines an area that the early warning satellite 100 observed. In particular, a wide area observation direction in which the early warning satellite 100 observed is specified based on the attitude of the early warning satellite 100. Based on the specified wide area observation direction and the position of the early warning satellite 100, the observed area is specified. By comparing the observed area and the position in the wide area captured image where the area that represents the target 10 is included, the processor 420 estimates the position of the target 10.

In the step S140 shown in FIG. 7B, the processor 420 selects, based on the position of the target 10, two or more observation satellites 300 that observes the target 10, in order to estimate the position of the target 10 with high accuracy. For example, the processor 420 selects two or more observation satellites 300 with longest observable periods of the target 10. In this case, the processor 420 estimates, based on the position of the target 10, an estimated route along which the target 10 moves. For example, the processor 420 estimates, based on the wide area observation information acquired from the early warning satellite 100 or the high-precision observation information acquired from the observation satellites 300, a line segment that connects positions of the target 10 acquired in the past as a trajectory of the target 10. The estimated route of the target 10 is estimated based on the estimated trajectory of the target 10. The processor 420 selects two or more observation satellites 300 with longest observable periods of the target 10 when the target 10 moves along the estimated route. Herein, the selected two or more observation satellites 300 will be referred to as selected satellites.

In the step S150, the processor 420 generates an observation schedule 510 for each of the selected two or more selected satellites to observe the target 10. As shown in FIG. 4, the processor 420 registers an observation time, an observation position and a target number in the observation schedule 510 corresponding to the selected satellites. The processor 420 registers an identifier that represents the target 10 to observe as the target number. The estimated position of the target 10 is registered as the observation position. The processor 420 calculates a time at which each of the selected satellites can observe the position of the target 10 and registers the calculated time as the observation time. For example, the observation time is calculated based on an attitude of the selected satellite, an observation direction in which the high-precision observation device 330 was observing just before, a time for the selected satellite to change the attitude in order to capture the target 10 and a time for the high-precision observation device 330 to change the observation direction. The processor 420 generates an observation request signal that represents the generated observation schedule 510. The generated observation request signal is transmitted to the corresponding selected satellite. As shown in FIG. 4, the observation schedule 510 represented by the observation request signal may represent a plurality of observation times, a plurality of observation positions and a plurality of target numbers in order to observe a plurality of targets 10 in order.

In the step S160 shown in FIG. 7B, the processor 320 of each of the selected satellites stores, when receiving the observation request signal, the observation schedule 510 represented by the observation request signal in the storage device 340. The processor 320 controls the high-precision observation device 330 based on the stored observation schedule 510 and acquires the high-precision observation information. For example, the processor 320 acquires an observation time of a next observation from the observation schedule 510 shown in FIG. 4. The processor 320 changes the attitude of the selected satellite equipped with the processor 320 and the observation direction of the high-precision observation device 330 so as to make possible to observe the observation position at the observation time indicated in the observation schedule 510. The processor 320 controls the high-precision observation device 330 when the current time reaches the observation time, observes a relatively narrow area of the ground surface 20 centered on the estimated position of the target 10, from a low orbit, and acquires the high-precision observation information. For example, the high-precision observation device 330 captures the area centered on the position of the target 10 and acquires the high-precision captured image. As a result, each selected satellite observes the target 10 at a same time. The processor 320 of each selected satellite generates a high-precision observation signal that represents the acquired high-precision observation information such as the high-precision captured image, and transmits the high-precision observation signal to the processor 420 of the target tracking device

400. The processor 320 of each selected satellite may transmit at once a plurality of high-precision observation signals that represent high-precision observation information acquired by observation of a plurality of targets 10 such as a plurality of high-precision captured images. The high-precision observation information may include information that represents a position of the selected satellite and an attitude of the selected satellite when the high-precision observation device 330 observed and an observation direction in which the high-precision observation device 330 observed. The high-precision observation information may further include the identifier of the observed target 10.

In the step S170 shown in FIG. 7B, the processor 420 of the target tracking device 400 extracts, when receiving a high-precision observation signal from each selected satellite, high-precision observation information from the high-precision observation signal and determines whether information that represents the target 10 is included in the high-precision observation information. The processor 420 ends the process when no information representing the target 10 is included in the high-precision observation information. For example, the processor 420 determines whether an area that represents the target 10 is included in the high-precision captured image. When no area representing the target 10 is included in the high-precision captured image, the processor 420 determines that no information representing the target 10 is included in the high-precision observation information and ends the process of tracking the target 10. When an area that represents the target 10 is included in the high-precision captured image, the processor 420 determines that information that represents the target 10 is included in the high-precision observation information and executes the process in the step S180. Herein, when an area that represents the target 10 is included in high-precision captured images acquired from two or more selected satellites, the processor 420 may determine that information that represents the target 10 is included in the high-precision observation information. In addition, when no area representing the target 10 is included in high-precision captured image received from at least one selected satellite, the processor 420 may determine that no information representing the target 10 is included in the high-precision observation information.

In the step S180, the processor 420 estimate the position of the target 10 based on the high-precision observation information acquired from two or more selected satellites. The processor 420 extracts for example the position and the attitude of the selected satellite and the observation direction of the high-precision observation device 330 from the high-precision observation information and specifies the high-precision observation direction (the observation direction) in which the selected satellite observed. In particular, the high-precision observation direction in which the selected satellite observed is specified based on the attitude of the selected satellite and the observation direction of the high-precision observation device 330.

The processor 420 calculates, based on the high-precision observation direction and a relative direction of the target 10 in the high-precision observation information, a relative direction of the target 10 with respect to the selected satellite. For example, by comparing a high-precision observation direction in which the selected satellite observed and a position where an area that represents the target 10 is included with respect to the high-precision captured image, the processor 420 calculates a relative direction of the target 10 with respect to the selected satellite.

The processor 420 estimates the position of the target 10 based on the calculated relative direction of the target 10 with respect to the two or more selected satellites. For example, the processor 420 estimates the position of the target 10 based on a position of each selected satellite when it observed the target 10 and a relative direction of the target 10 with respect to each selected satellite. The position of the target 10 is estimated by use of principle of triangulation for example.

The processor 420 outputs information that represents the estimated position of the target 10 as an output signal to the input/output device 430. The input/output device 430 outputs, based on the output signal, information that represents the position of the target 10. A user conforms the position of the target 10 by an outputting of the information that represents the position of the target 10 by the input/output device 430. In addition, the processor 420 may output information that represents the estimated position of the target 10 as the output signal to another device. For example, another device copes with the target 10 based on the output signal.

The processor 420 returns, when estimating the position of the target 10, to the process of the step S140 and selects, based on the estimated position of the target 10, two or more observation satellites 300. As described above, by repetition of the processes in the steps S140 to S180, the target tracking system 1000 estimates with high accuracy the position of the target 10 such as a longitude, a latitude a height and the like, and tracks the target 10. Another device or a user can cope with the target 10 based on the position of the target 10 which is estimated with high accuracy.

It should be noted that the target detection means 501 makes the processor 420 of the target tracking device 400 execute processes of the step S120 and the step S130. The satellite selection means 502 makes the processor 420 execute the process of the step S140. The schedule setting means 503 makes the processor 420 execute the process of the step S150. The estimating means 504 makes the processor 420 execute the processes of the step S170 and the step S180.

(Variation) As long as the observation schedule 510 shown in FIG. 4 includes information for the observation satellite 300 to observe the target 10 at the observation time, the observation schedule 510 may have an arbitrary configuration. For example, the observation position of the observation schedule 510 may represent an observation direction of observation from the observation satellite 300 at the observation time. In this case, in addition, the processor 420 of the target tracking device 400 calculates the position of the observation satellite 300 at the observation time, calculates a direction from the calculated position of the observation satellite 300 to the position of the target 10 and registers the calculated direction as the observation direction in the observation schedule 510. The processor 320 of the observation satellite 300 controls the attitude of the observation satellite 300 and the high-precision observation device 330 so as to observe the observation direction indicated in the observation schedule 510 at the observation time indicated in the observation schedule 510.

The wide area observation device 130 of the early warning satellite 100 shown in FIG. 2 may be configured so that the observation direction can be changed. In this case, the wide area observation information transmitted from the early warning satellite 100 to the target tracking device 400 includes information that represents the observation direction in which the wide area observation device 130 observed. In the step 130 shown in FIG. 7A, the processor 420 of the target tracking device 400 specifies the area the early warning satellite 100 observed based on the attitude of the early warning satellite 100 and the observation direction of the wide area observation device 130. In particular, the wide area observation direction in which the early warning satellite 100 observed is specified based on the attitude of the early warning satellite 100 and the observation direction of the wide area observation device 130. Based on the specified wide area observation direction and the position of the early warning satellite 100, the observed area is specified. By comparing the observed area and the position in the wide area captured image where the area that represents the target 10 is included, the processor 420 estimates the position of the target 10.

In the step S140 shown in FIG. 7B, the processor 420 may select two or more observation satellites 300 by an arbitrary method, as long as two or more observation satellites 300 able to observe the target 10 at a same time can be selected. For example, the processor 420 may select two or more observation satellites 300 that are closest to the estimated position of the target 10.

The high-precision observation device 330 of the observation satellite 300 shown in FIG. 3 may be configured to observe a fixed direction from the observation satellite 300. In this case, in the step S160 shown in FIG. 7B, the processor 320 of the selected satellite controls the attitude of the selected satellite so as to make possible to observe the observation position at the observation time indicated in the observation schedule 510. The processor 320 controls the high-precision observation device 330 when the current time reaches the observation time and acquires high-precision observation information. The acquired high-precision observation information is transmitted to the processor 420 of the target tracking device 400. In the step S180 shown in FIG. 7B, the processor 420 specifies, based on the attitude of the selected satellite, the high-precision observation direction in which the selected satellite observed. The processor 420 calculates a relative direction from the selected satellite to the target 10 based on the specified high-precision observation direction and information of the target 10 included in the high-precision observation information. The processor 420 estimates the position of the target 10 based on the relative direction from each selected satellite to the target 10 and the position of each selected satellite.

The processor 420 of the target tracking device 400 shown in FIG. 5 may acquire wide area observation information from an arbitrary device as long as the position of the target 10 can be estimated from the wide area observation information. For example, the wide area observation information may be acquired from a radar site arranged on the ground surface 20 and may be acquired from an aircraft flying in the atmosphere.

The embodiments and the variations described in the above are examples and may be modified within a range of not inhibiting the function. In addition, the configurations described in each of embodiments and variations may be arbitrarily modified and/or arbitrarily combined within a range of not inhibiting the function. For example, the target tracking device 400 may communicate with the early warning satellite 100 or the observation satellites 300 directly without using the communication satellite 200.

The target tracking device according to each embodiment is understood for example as below.

A target tracking device according to a first aspect is provided with a communication device (410) and a processor (420). The processor (420) executes a selection of satellites, a setting of a schedule and an estimation.

The setting of a schedule includes determining an observation schedule (510) for two or more selected satellites to observe a target (10) at a same time. In addition, the estimation includes estimating, based on high-precision observation information observed by the two or more selected satellites, a position of the target (10). As a result, the target tracking device (400) can estimate the position of the target (10) with high accuracy.

A target tracking device according to a second aspect is the target tracking device according to the first aspect and is configured so that the selection of satellites includes selecting the two or more selected satellites based on a moving route of the target (10).

A target tracking device according to a third aspect is the target tracking device according to the second aspect and is configured so that the selection of satellites includes selecting, based on the moving route of the target (10), the two or more selected satellites of which observation period is relatively long.

As a result, since a same observation satellite (300) observes the target (10) during a long period, effect of measurement errors such as an error in the position of the observation satellite (300), an error in an observation direction and the like can be reduced.

A target tracking device according to a fourth aspect is the target tracking device according to the first aspect and is configured so that a first target (10) to observe at a first time indicated in the observation schedule (510) is different from a second target (10) to observe at a second time.

As a result, by observing a plurality of targets (10) by a single observation satellite (300), the target tracking device can estimate at a same time positions of the plurality of targets (10) that exist in a predetermined range.

A target tracking device according to a fifth aspect is the target tracking device according to a first aspect and is configured so that the estimation includes estimating the position of the target (10) based on a relative direction from each selected satellite to the target (10).

As a result, the target tracking device can estimate the position of the target (10) that includes a height.

A non-transitory tangible storage medium stores a target tracking program according to a sixth aspect that makes a processor (420) execute a selection of satellites, a setting of a schedule and an estimation.

The setting of a schedule includes determining an observation schedule (510) for two or more selected satellites to observe a target (10) at a same time. In addition, the estimation includes estimating a position of the target (10) based on high-precision observation information that the two or more selected satellites observed. As a result, the processor (420) can estimate the position of the target (10) with high accuracy.

What is claimed is:
1. A target tracking device comprising:
   a communication device configured to perform communication with a plurality of observation satellites configured to observe a target; and
   a processor configured to estimate a position of the target based on observation information that represents information of the target observed by the plurality of observation satellites,
   wherein the processor is further configured to execute:
     selecting, based on the position of the target, two or more selected satellites configured to observe the target, among the plurality of observation satellites;
     determining an observation schedule for each of the two or more selected satellites to observe the target;

transmitting an observation request signal that represents the determined observation schedule to a corresponding selected satellite of the two or more selected satellites;

estimating, based on two or more pieces of the observation information respectively observed by the two or more selected satellites, the position of the target; and outputting an output signal that represents the estimated position of the target, and wherein in the observation schedule a first time when a first selected satellite of the two or more selected satellites observes the target is same as a second time when a second selected satellite of the two or more selected satellites observes the target, and wherein the selecting includes: estimating a moving route along which the target moves; and selecting, based on the estimated moving route, the two or more selected satellites.

2. The target tracking device according to claim 1, wherein the selecting further includes:

calculating, based on the moving route, an observation period during which each of the plurality of observation satellites can observe the target; and selecting the two or more selected satellites with longest the observation periods among the plurality of observation satellites.

3. The target tracking device according to claim 1, wherein the observation schedule represents a plurality of observation times and an observation position to be observed at each time of the plurality of observation times, and wherein a first target to observe at a first observation time among the plurality of observation times is different from a second target to observe at a second observation time among the plurality of observation times.

4. The target tracking device according to claim 1, wherein the estimating includes:

calculating, based on an attitude of the selected satellite when the selected satellite observed the target, an observation direction observed from the selected satellite;

calculating, based on the observation direction and information of the target included in the observation information, a relative direction from each of the selected satellites to the target; and estimating, based on the relative direction and a position of each of the selected satellites, the position of the target.

5. A non-transitory tangible storage medium that stores a target tracking program configured to make a processor execute:

selecting, based on a position of a target of observation, two or more selected satellites configured to observe the target, among a plurality of observation satellites;

determining an observation schedule for each of the two or more selected satellites to observe the target;

transmitting an observation request signal that represents the determined observation schedule to a corresponding selected satellite of the two or more selected satellites;

estimating, based on two or more pieces of observation information respectively observed by the two or more selected satellites, the position of the target; and outputting an output signal that represents the estimated position of the target, and wherein in the observation schedule a first time when a first selected satellite of the two or more selected satellites observes the target is same as a second time when a second selected satellite of the two or more selected satellites observes the target, and wherein the selecting includes: estimating a moving route along which the target moves; and selecting, based on the estimated moving route, the two or more selected satellites.

6. The target tracking device according to claim 1, wherein the target has no device to communicate with the plurality of observation satellites.

7. The non-transitory tangible storage medium according to claim 5, wherein the target has no device to communicate with the plurality of observation satellites.

* * * * *